United States Patent
Kang et al.

(10) Patent No.: US 10,468,681 B2
(45) Date of Patent: Nov. 5, 2019

(54) OLIVINE CATHODE MATERIAL CAPABLE OF 3-DIMENSIONAL LITHIUM DIFFUSION AND METHOD OF PREPARING THE SAME

(71) Applicant: Seoul National University R&DB Foundation, Seoul (KR)

(72) Inventors: Ki-Suk Kang, Gwacheon-si (KR); Kyu-Young Park, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 15/745,945

(22) PCT Filed: Jul. 20, 2016

(86) PCT No.: PCT/KR2016/007895
§ 371 (c)(1),
(2) Date: Jan. 18, 2018

(87) PCT Pub. No.: WO2017/026690
PCT Pub. Date: Feb. 16, 2017

(65) Prior Publication Data
US 2018/0212243 A1    Jul. 26, 2018

(30) Foreign Application Priority Data
Aug. 12, 2015 (KR) .................. 10-2015-0113767

(51) Int. Cl.
*H01B 1/06* (2006.01)
*H01M 4/00* (2006.01)
(Continued)

(52) U.S. Cl.
CPC ............ *H01M 4/5825* (2013.01); *H01B 1/06* (2013.01); *H01M 10/0525* (2013.01); *H01M 2004/028* (2013.01)

(58) Field of Classification Search
CPC .. H01B 1/00; H01B 1/06; H01M 4/36; H01M 4/505; H01M 4/525; H01M 10/052
See application file for complete search history.

(56) References Cited

U.S. PATENT DOCUMENTS 7,629,080 B1    12/2009    Allen et al.
8,865,349 B2 *  10/2014    Okada .................. C01B 25/45
                                                        429/224
(Continued)

FOREIGN PATENT DOCUMENTS

CN         1960034    *  5/2007
CN       101373831    *  2/2009
(Continued)

OTHER PUBLICATIONS

Allen et al "Electronic Properties of LiFePO4 and doped LiFePO4", Lawrence Berkeley National Laboratory (May 31, 2006).*
(Continued)

*Primary Examiner* — Mark Kopec
(74) *Attorney, Agent, or Firm* — Lewis Roca Rothgerber Christie LLP

(57) ABSTRACT

An olivine cathode material capable of 3-dimensional lithium diffusion and a method of preparing the same is provided, and more particularly, an olivine cathode material capable of 3-dimensional lithium diffusion having an olivine crystal structure of a composition of the following formula 1, wherein excess lithium ions are present in an iron ion site is provided.

$Li(Li_xFe_{1-x})PO_4$ (the x=0.01 to 0.05)     [Formula 1]

6 Claims, 7 Drawing Sheets

(51) Int. Cl.
*H01M 4/58* (2010.01)
*H01M 10/0525* (2010.01)
*H01M 4/02* (2006.01)

(56) References Cited

U.S. PATENT DOCUMENTS

| | | | | |
|---|---|---|---|---|
| 2004/0005265 | A1* | 1/2004 | Chiang | H01M 4/5825 |
| | | | | 423/306 |
| 2008/0168865 | A1* | 7/2008 | Zhang | H01M 4/1397 |
| | | | | 75/751 |
| 2012/0003529 | A1* | 1/2012 | Yamakaji | H01M 4/131 |
| | | | | 429/211 |

FOREIGN PATENT DOCUMENTS

| KR | 10-2012-0022629 A | 3/2012 |
|---|---|---|
| KR | 10-2013-0033060 A | 4/2013 |
| KR | 10-2014-0148408 A | 12/2014 |

OTHER PUBLICATIONS

Allen, J. L. et al.; "Synthesis and electronic properties of Li doped $LiFePO_4$"; University of California Berkeley LAB, May 31, 2006; pp. 1-23.

Lin, Xinghao et al.; "Subsolidus phase relations of $Li_2O$—FeO—$P_2O_5$ system and the solid solubility of $Li_{1+x}Fe_{1+x}PO_4$ compounds under $Ar/H_2$ atmosphere"; J. Mater. Sci.; 2015; 50; pp. 203-209.

\* cited by examiner

OLIVINE CATHODE MATERIAL CAPABLE OF 3-DIMENSIONAL LITHIUM DIFFUSION AND METHOD OF PREPARING THE SAME

CROSS-REFERENCE TO RELATED APPLICATIONS

This application is a National Phase patent application and claims priority to and the benefit of International Application Number PCT/KR2016/007895, filed on Jul. 20, 2016, which claims priority to and the benefit of Korean Patent Application No. 10-2015-0113767, filed on Aug. 12, 2015, the entire contents of each of which are incorporated herein by reference.

BACKGROUND OF THE INVENTION

1. Field of the Invention

The present disclosure relates to an olivine cathode material capable of 3-dimensional lithium diffusion and a method of preparing the same.

2. Description of the Related Art

In accordance with the trend of weight reduction and miniaturization of notebooks, mobile phones, hybrid and electric vehicle products, lithium secondary batteries with high energy density have been actively developed. Generally, a lithium secondary battery is configured to have a negative electrode coated with graphite capable of occluding and releasing lithium, a positive electrode coated with a composite oxide containing lithium, and an organic electrolyte. Cathode material used for such a lithium secondary battery should satisfy the conditions such as high energy density, excellent cycle characteristics when charging and discharging, and chemical stability for the electrolyte. $LiCoO_2$, $LiNiO_2$, $LiMnO_2$ and the like are mainly used as a cathode material configuring the positive electrode of a lithium secondary battery. However, there are problems where such cathode materials are expensive, have environmental pollution issues, are difficult to prepare, have poor thermal stability, and have a problem that electrode degradation occurs rapidly and electric conductivity is lowered at a high temperature.

As an alternative cathode material, there are olivine cathode materials ($LiTMPO_4$, TM=Fe, Mn, Co, and Ni), and since olivine cathode materials have high theoretical energy density, relatively low preparing costs, high thermal stability and long life, they are being noticed as an important secondary battery material for medium and large-sized energy storage devices. However, there is a fundamental limitation that the diffusion path of lithium ions is a single path (one-dimensional path, crystallographic b-axis direction), and it has been revealed that because of this, the cation exchange defect existing on the diffusion path is greatly influenced by the electrochemical characteristics. The cation exchange defect is a type of point defect that changes the crystallographic position of lithium and transition metal (TM) ions configuring the olivine material one-on-one, and depending on the synthesis process, it is produced in a ratio ranging from 0.5 to 5%. Since the generated cation exchange defects interfere with the movement of lithium ions, even just a small amount of defects cause a significant reduction in electrode capacity and output characteristics. According to previous studies, if a number of micron-sized particles have about 0.1% of position exchange defects, statistically, the capacity of the olivine electrode material is reduced to about half, and the lithium ion diffusion coefficient is about 100 to 1000 times lower.

Therefore, in order to overcome the negative effects of cation exchange defects, synthetic methods have been developed where the size of an olivine electrode material particle is synthesized in tens of nano-units, or surface modification and doping chemically was used, but such methods created problems of additional costs, low active particle density on electrodes, or surface side reactions.

As a prior art related thereto, there is a method of preparing an olivine cathode material for a lithium secondary battery, disclosed in Korean Patent Publication No. 10-2012-0022629 (published on Mar. 12, 2012).

SUMMARY OF THE INVENTION

The present disclosure is directed to providing a cathode capable of 3-dimensional lithium diffusion and a preparing method thereof wherein the preparing method is simple and a cation exchange defect doesn't occur, thereby being capable of improving the electrochemical characteristics of a cathode material.

The problems to be solved by the present disclosure are not limited to the above-mentioned problem(s), and other problem(s) not mentioned can be clearly understood by those skilled in the art from the following description.

In an aspect of the present disclosure, an olivine cathode material capable of 3-dimensional lithium diffusion may have an olivine crystal structure of a composition of the following formula 1, and excess lithium ions may be present in an iron ion site.

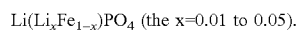

$Li(Li_xFe_{1-x})PO_4$ (the x=0.01 to 0.05). [Formula 1]

In another aspect of the present disclosure, a method of preparing an olivine cathode capable of 3-dimensional lithium diffusion may include, preparing a mixed powder by mixing a lithium precursor, an iron precursor, and an ammonium compound; compressing after performing primary heat treatment on the mixed powder; and performing secondary heat treatment on the compressed mixed powder.

According to the present disclosure, an excess amount of lithium ions are contained such that the lithium occupies a transition metal site, thereby allowing lithium ions to diffuse 3-dimensionally during charging and discharging, and since a large amount of lithium participates in charging and discharging, the charge and discharge capacity and efficiency are improved.

In addition, the structural stability can be improved because the crystal lattice gap is relatively small during the process of adsorption and desorption of lithium when charging and discharging.

In addition, the method of preparing an olivine cathode material capable of 3-dimensional lithium diffusion according to the present disclosure can produce a cathode material by a simpler method than the conventional method by a stirring and heat treatment process, and since an excess amount of monovalent lithium ions are contained in the crystal structure, the oxidation number of an internal transition metal is higher than that of a general olivine material, and thus the electrical performance can be improved since it does not generate point defects such as cation exchange defects.

DETAILED DESCRIPTION OF THE INVENTION

Figure 1:
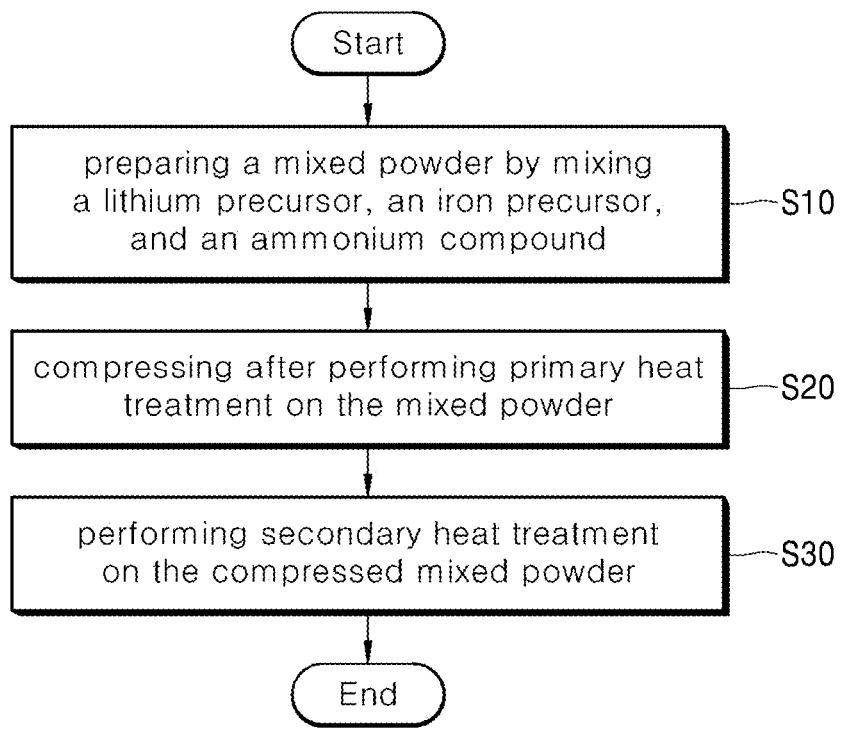
FIG. 1 is a flowchart showing a method of preparing an olivine cathode material capable of 3-dimensional lithium diffusion according to the present disclosure.

Hereinafter, exemplary embodiments of the present disclosure will be described in detail with reference to the accompanying drawings.

The advantages and features of the present disclosure and the manner of accomplishing it will become apparent with reference to the embodiments described in detail below with reference to the accompanying drawings.

The present disclosure may, however, be embodied in many different forms and should not be construed as limited to the exemplary embodiments set forth herein. Rather, these embodiments are provided so that this disclosure will be thorough and complete, and will fully convey the scope of the invention to those skilled in the art. To fully disclose the scope of the invention to those skilled in the art, and the invention is only defined by the scope of the claims.

In the following description of the present disclosure, a detailed description of known functions and configurations incorporated herein will be omitted when it may make the subject matter of the present disclosure rather unclear.

The present disclosure provides an olivine cathode capable of 3-dimensional lithium diffusion having an olivine crystal structure of a composition of the following formula 1, wherein excess lithium ions are present in an iron ion site.

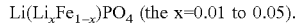

Li(Li$_x$Fe$_{1-x}$)PO$_4$ (the x=0.01 to 0.05).  [Formula 1]

The olivine cathode material capable of 3-dimensional lithium diffusion according to the present disclosure contains lithium ions in an excessive amount so that the lithium occupies a transition metal site, thereby allowing lithium ions to diffuse 3-dimensionally during charging and discharging, and since a large amount of lithium participate in charging and discharging, the charge and discharge capacity and efficiency are improved. Thus the olivine cathode material can be used as a high-output cathode material. In addition, the structural stability can be improved because the crystal lattice gap is relatively small during the process of adsorption and desorption of lithium when charging and discharging.

The olivine cathode material has a molar ratio as described above, and since a cation exchange defect increases the average value of thermodynamic generation energy that is generated, it can effectively remove cation exchange defects, and has a crystal structure of Pnma or Pnmb.

In addition, in the olivine cathode material capable of 3-dimensional lithium diffusion according to the present disclosure, even if a small amount of the transition metal is substituted with other elements (for example, Cr and Mg), it is possible not to generate cation exchange defects.

Further, the present disclosure provides a method of preparing an olivine cathode capable of 3-dimensional lithium diffusion including, preparing a mixed powder by mixing a lithium precursor, an iron precursor, and an ammonium compound; compressing after performing primary heat treatment on the mixed powder; and performing secondary heat treatment on the compressed mixed powder.

The method of preparing an olivine cathode material capable of 3-dimensional lithium diffusion according to the present disclosure can produce a cathode material by a simpler method than the conventional method by a stirring and heat treatment process, and since an excess amount of monovalent lithium ions are contained in the crystal structure, the oxidation number of an internal transition metal is higher than that of a general olivine material, and thus the electrical performance can be improved since it does not generate point defects such as cation exchange defects.

FIG. 1 is a flowchart showing a method of preparing an olivine cathode material capable of 3-dimensional lithium diffusion according to the present disclosure. Hereinafter, the present disclosure will be described in detail with reference to FIG. 1.

The method of preparing an olivine cathode material capable of 3-dimensional lithium diffusion according to the present disclosure includes preparing a mixed powder by mixing a lithium precursor, an iron precursor and an ammonium compound in step S10.

At this time, the lithium precursor may be one selected from a group consisting of lithium carbonate (Li$_2$CO$_3$), lithium phosphate (Li$_3$PO$_4$), lithium oxalate (Li$_2$C$_2$O$_4$), and lithium hydroxide (LiOH). The iron precursor may be one selected from a group consisting of iron oxalate dehydrate (FeC$_2$O$_4$.2H$_2$O), ferrous sulfate heptahydrate (FeSO$_4$.H$_2$O), ferric citrate hydrate (FeC$_6$H$_5$O$_7$.nH$_2$O), ferric phosphate dihydrate (FePO$_4$.H$_2$O), and ferric hydroxide (FeO(OH)). The ammonium compound may be ammonium carbonate ((NH$_4$)$_2$CO$_3$) or ammonium hydrogen carbonate (NH$_4$HCO$_3$) or the like.

The lithium precursor, the iron precursor and the ammonium compound may be mixed and stirred to have a molar ratio of lithium (Li):transition metal (TM):phosphorus (P) to be 1+x (1.01 to 1.05):1−x (0.95 to 0.99):1, (the x=0.01 to 0.05).

The TM can use two or more transition metals and the total molar ratio should be 0.95 to 0.99. In the range where x is larger than 0.05, impurities that lower the electrochemical characteristics may be generated during the heat treatment process, and therefore, it is preferable to be 0.05 or less.

The stirring may be performed in a dry and wet process, and it is preferable to stir in an inert gas to prevent oxidation of the transition metal. When the stirring is performed dry, it is preferably milled at a speed of 200 to 400 rpm in an inert gas atmosphere. When the milling is performed at less than 200 rpm, there is a problem where the lithium precursor, iron precursor and ammonium compound are not uniformly mixed. When the milling is performed at less than 200 rpm, there is a problem where undesired phases are generated first such that a cathode material of an olivine structure cannot be prepared.

In addition, when the stirring is performed in a wet process, it can be performed by mixing an organic solvent in a ratio of 2.5 to 3.5 by weight relative to the total weight of the mixed powder. The organic solvent may be one selected from a group consisting of acetone, ethanol, and acetonitrile. When the organic solvent is mixed in an amount of less than a weight ratio of 2.5, there is a problem where the lithium precursor, the iron precursor, and the ammonium compound are not uniformly mixed. Also, when the amount exceeds a weight ratio of 3.5, there is a problem where uniform stirring is not performed well.

Next, a method of preparing an olivine cathode material capable of 3-dimensional lithium diffusion according to the present disclosure includes compressing after performing primary heat treatment on the mixed powder in step S20.

The method of preparing the olivine cathode material capable of 3-dimensional lithium diffusion according to the present disclosure can improve the electrochemical characteristics of a cathode material produced by performing primary heat treatment on the mixed powder.

The primary heat treatment may be performed in an inert atmosphere of argon or nitrogen at 300° C. to 500° C. for 4 to 10 hours. If the primary heat treatment is not performed in an inert atmosphere, there is a problem that the oxidation number of a transition metal is increased, so that an olivine cathode material containing lithium in an excessive amount is not produced and impurities are generated. When the primary heat treatment is performed at a temperature lower than 300° C., there is a problem that the phase is not formed properly at the time of a secondary heat treatment, and when the temperature is higher than 500° C., there is a problem that impurities may be generated. The reason for limiting time is the same as the reason for limiting the temperature.

The compressing (pelleting) may be performed at a pressure of 200 bars to 400 bars. When the pressure is less than 200 bars, there is a problem that the heat-treated mixed powder does not aggregate and the electrochemical characteristics of the cathode material are not improved. When the pressure exceeds 400 bars, not only is it difficult to achieve a pressure exceeding 400 bars, but in terms of process efficiency and cost saving, it is appropriate to be performed at a pressure of 400 bars or less.

The method of preparing an olivine cathode material capable of 3-dimensional lithium diffusion according to the present disclosure includes performing secondary heat treatment on the compressed mixed powder in step S30.

The secondary heat treatment temperature may be performed in an inert atmosphere at 550° C. to 650° C. for 4 to 10 hours. When the secondary heat treatment is performed at a temperature lower than 550° C., there is a problem that the electrochemical characteristic of the cathode material is not realized well due to low crystallinity. When the temperature exceeds 650° C., an olivine cathode material with an excess amount of lithium is not produced so there is a problem that 3-dimensional lithium diffusion does not occur, and there is a problem that a high speed charging and discharging capacity and charging and discharging efficiency are lowered. With the reason for time limitation being the same as the reason for limiting the temperature of the secondary heat treatment, it is preferable to be performed for 4 to 10 hours.

Further, in a method of preparing an olivine cathode material capable of 3-dimensional lithium diffusion according to the present disclosure, a manganese precursor may be further included when preparing the mixed powder to form two types of transition metals on a cathode material.

At this time, it is preferable that the manganese precursor is $MnC_2O_4 \cdot 2H_2O$. As described above, the content of the manganese precursor may be mixed such that the total molar ratio of the transition metal is 1−x (x=0.01 to 0.05).

Further, in a method of preparing an olivine cathode material capable of 3-dimensional lithium diffusion according to the present disclosure, a carbon material for carbon coating may be further added to the surface of the cathode material during the preparation of the mixed powder or the compressing process to improve the electrochemical characteristic of the cathode material. The carbon material may be at least one selected from a group consisting of graphite, activated carbon, carbon black, Ketjen black, acetylene black, and super P, and may be contained in an amount of 1 to 10 wt % of the total weight of the mixed powder and carbon material.

Example 1: Preparation of an Olivine Cathode Material Capable of 3-Dimensional Lithium Diffusion 1

2.746 g of $Li_2CO_3$, 12.084 g of $FeC_2O_4 \cdot 2H_2O$ and 9.3375 g of $(NH_4)2HPO_4$ powder were stirred in acetone for 24 hours by a wet ball milling process. At this time, the weight ratio of acetone to powder was set to 3:1 to be mixed. The precursor slurry prepared by the wet ball milling process was dried for 48 hours or more at room temperature, and then a process of primary heat treatment was performed on the dried powder in an Ar atmosphere at 350° C. for about 7 hours. At this time, the total flow rate of Ar gas was set to 1 L/min. After the completion of the primary heat treatment process, the obtained powder was compressed into a disk form at a pressure of 300 bars and then a secondary heat treatment was performed thereon. The secondary heat treatment was performed in an Ar atmosphere at 600° C. for about 10 hours, and the total flow rate of Ar gas was limited to 1 L/min. After the secondary heat treatment process, it was completely pulverized into powder form to prepare an olivine cathode material capable of 3-dimensional lithium diffusion.

Example 2: Preparation of an Olivine Cathode Material Capable of 3-Dimensional Lithium Diffusion 2

2.746 g of $Li_2CO_3$, 6.041 g of $FeC_2O_4 \cdot 2H_2O$, 6.012 g of $MnC_2O_4 \cdot 2H_2O$ and 9.3375 g of $(NH_4)_2HPO_4$ powder were stirred by dry milling for 12 hours to obtain a sufficiently mixed powder. At this time, the dry milling was performed under a high purity Ar atmosphere at a speed of 300 rpm or less. Then the powder is subjected to an Ar atmosphere at 600° C. for about 10 hours. The total flow rate of the Ar gas was limited to 2 L/min. The synthesized powder is further pulverized and then used as an electrode.

Example 3: Preparation of an Olivine Cathode Material Capable of 3-Dimensional Lithium Diffusion 3

6.046 g of $Li_2CO_3$, 6.041 g of $FeC_2O_4 \cdot 2H_2O$, 6.012 g of $MnC_2O_4 \cdot 2H_2O$ and 9.3375 g of $(NH_4)_2HPO_4$ powder were prepared in the same manner as in Example 1 to prepare an olivine cathode material capable of 3-dimensional lithium diffusion.

Example 4: Preparation of Olivine Cathode Material Capable of 3-Dimensional Lithium Diffusion 4

2.746 g of $Li_2CO_3$, 12.084 g of $FeC_2O_4 \cdot 2H_2O$ and 9.3375 g of $(NH_4)_2HPO_4$ powder were stirred in acetone for 24 hours by wet ball milling. At this time, for the material surface treatment, graphite was mixed and stirred with a total weight ratio of 95 (olivine mixed powder):5 (carbon precursor:graphite). At this time, the weight ratio of acetone to the mixed powder was 4:1. The mixed precursor slurry was dried in an oven at 120° C. for over 48 hours or more, and then a primary heat treatment was performed on the obtained powder at 450° C. in an Ar atmosphere for about 10 hours. At this time, the total flow rate of Ar gas was limited to 3 L/min. After completion of the above-described process, the obtained powder was compressed into a disk form at a pressure of 300 bars and then a secondary heat treatment was performed thereon. The secondary heat treatment was performed at 600° C. in an Ar atmosphere for about 10 hours, and the total flow rate of Ar gas was limited to 2 L/min. The synthesized sample is further pulverized completely into powder form and then used as an electrode.

Table 1 shows the types, contents, and carbon coverage of the starting materials of Examples 1 to 4 above.

Experimental Example 1: Analysis of Crystal Structure, Composition and Shape of Olivine Cathode Material The crystal structure, composition and shape of the olivine cathode material according to the present disclosure were analyzed by neutron diffraction, transmission electron microscopy (TEM) and scanning electron microscope (SEM), and the results are shown in FIG. 2, FIG. 3, FIGS. 4A-4C and Table 2.

Figure 2:
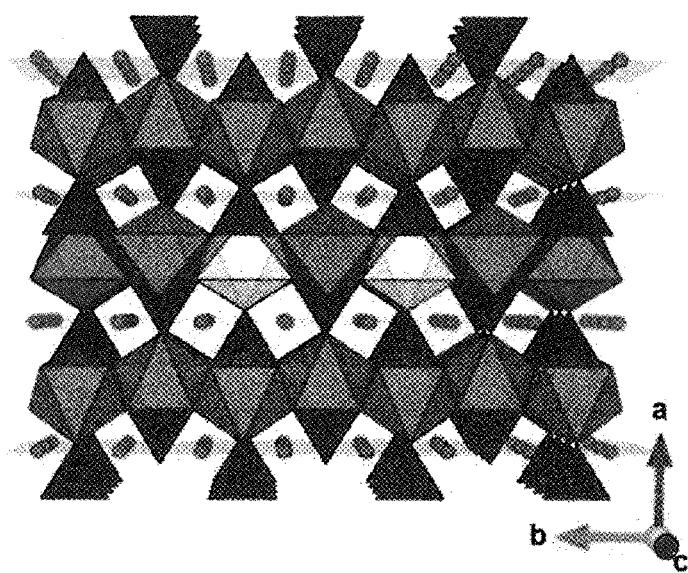
FIG. 2 is a schematic view showing a crystalline form of an olivine cathode material according to the present disclosure.

FIG. 2 is a schematic view showing a crystalline form of an olivine cathode material according to the present disclosure. As shown in FIG. 2, a cathode material according to the present disclosure shows an olivine crystal structure.

Figure 3:
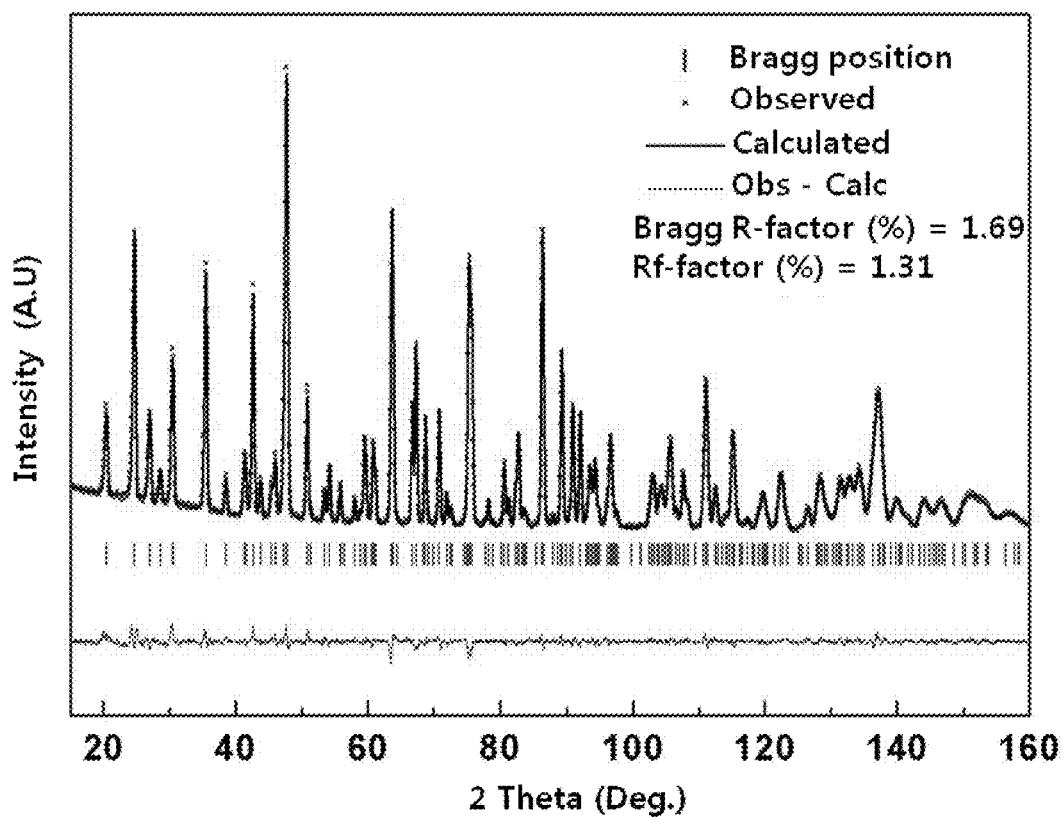
FIG. 3 shows a neutron diffraction analysis result of an olivine cathode material according to the present disclosure.

Further, FIG. 3 shows a neutron diffraction analysis result of an olivine cathode material according to the present disclosure. As shown in FIG. 3, it can be seen that the cation site exchange point defect is gone as compared with a general olivine cathode material.

Table 2 shows the lattice constant, lithium and iron distribution, ICP analysis results, and surface area of olivine cathode material according to the present disclosure.

TABLE 2

| | Lattice parameter | | | | Site occupancy | | ICP results | | | Surface area |
|---|---|---|---|---|---|---|---|---|---|---|
| | a(A) | b(A) | c(A) | Volume(A$^3$) | LiFe | FeLi | Li | Fe | P | (m$^2$/g) |
| LiFePO$_4$ | 10.3236(1) | 6.0055(8) | 4.69316) | 290.974(6) | 0.006(2) | 0.006(2) | 0.99(2) | 0.98(2) | 1.00(0) | 27 |
| Delithiated LiFePO$_4$ | 9.8251(1) | 5.7965(7) | 4.77504(4) | 271.977(10) | — | — | — | — | — | — |
| Li(Li$_{0.05}$Fe$_{0.95}$)PO$_4$ | 10.3271(1) | 6.00707(7) | 4.69227(5) | 281.090(5) | 0.042(2) | 0.000(2) | 1.08(3) | 0.94(1) | 1.00(0) | 20.2 |
| Delithiated Li(Li$_{0.05}$Fe$_{0.95}$)PO$_4$ | 9.8372(14) | 5.8052(9) | 4.7832(6) | 273.153(4) | — | — | — | — | — | — |

Figure 4A:
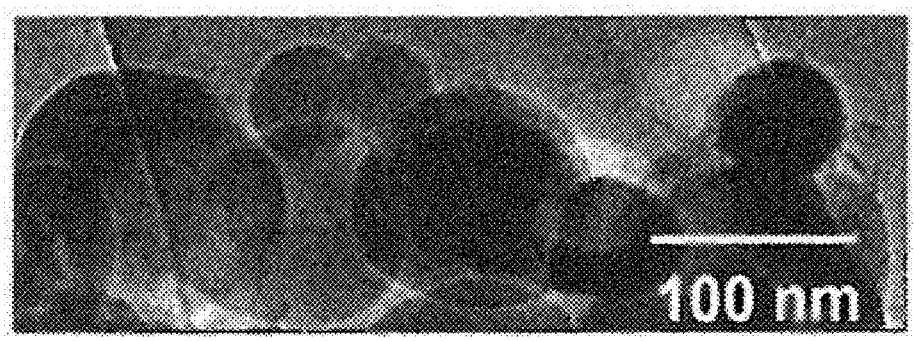
FIG. 4A is a transmission electron microscope image of an olivine cathode material according to the present disclosure.
Figure 4B:
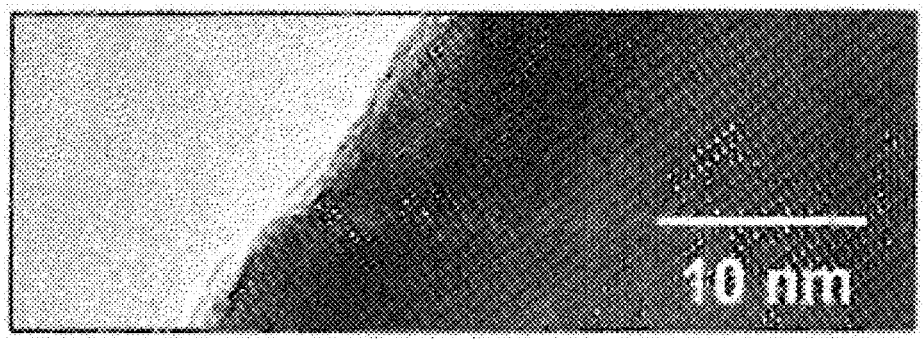
FIG. 4B is an enlarged view of FIG. 4A.
Figure 4C:
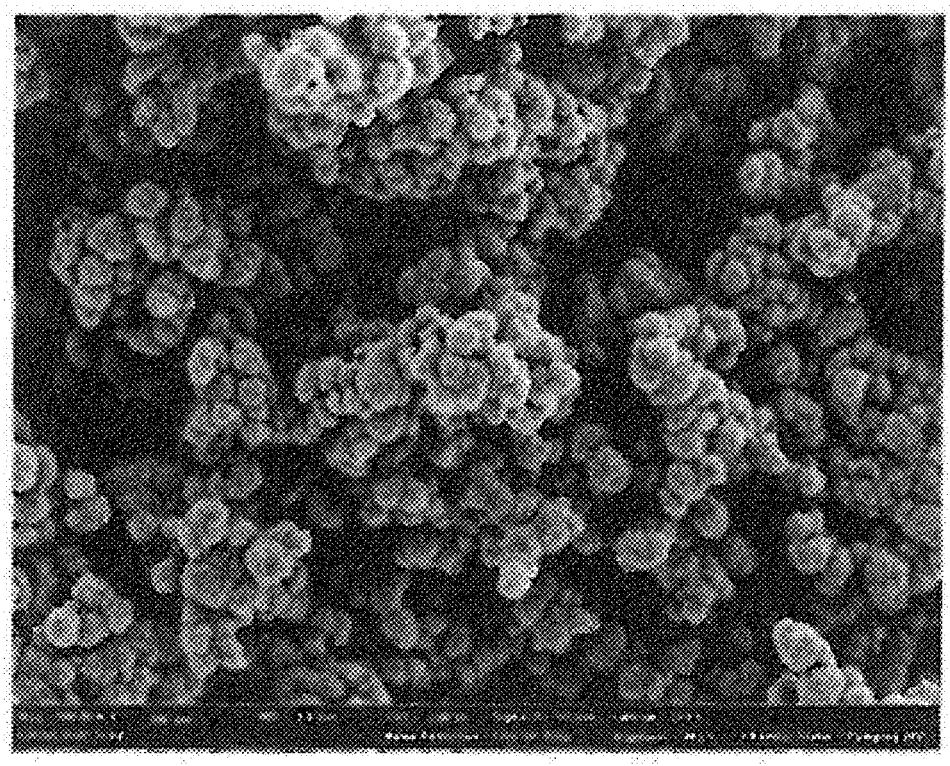
FIG. 4C is a scanning electron microscope of an olivine cathode material according to the present disclosure.

FIG. 4A is a transmission electron microscope image of an olivine cathode material according to the present disclosure, FIG. 4B is an enlarged view of FIG. 4A, and FIG. 4C is a scanning electron microscope of an olivine cathode material according to the present disclosure. As shown in FIGS. 4A-4C, the olivine cathode material according to the present disclosure does not contain other impurities on the surface and maintains high crystallinity.

Experimental Example 2: Analysis of Oxidation Number and Diffusion Paths of Lithium Ion in Olivine Cathode Material In order to figure out the oxidation number of an olivine cathode material and diffusion paths of lithium ion in an olivine cathode material according to the present disclosure, XANES and first principle calculations were used for analyzing. The results are shown in FIGS. 5, 6, 7 and 8 and Table 3.

Figure 5:
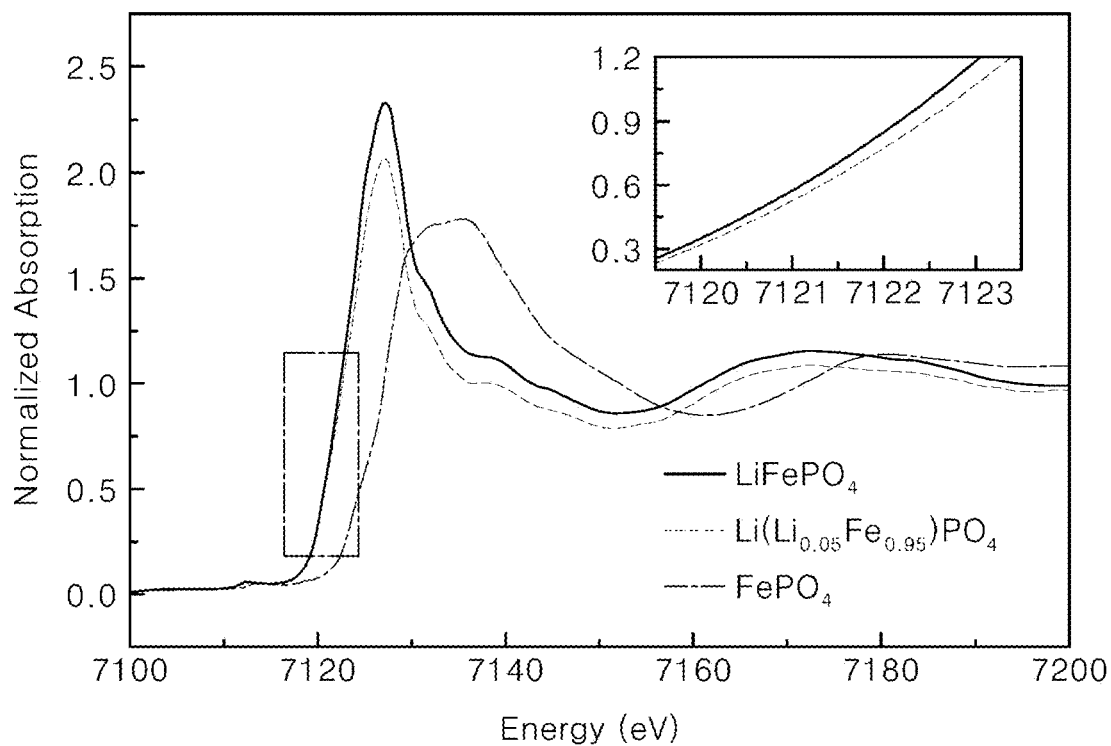
FIG. 5 shows the XANES measurement results of an olivine cathode material according to the present disclosure.

FIG. 5 shows the XANES measurement results of the olivine cathode material according to the present disclosure.

TABLE 1

| | Starting material | | | | Carbon |
|---|---|---|---|---|---|
| Example | Li$_2$CO$_3$ | Fe$_2$O$_4 \cdot$2H$_2$O | (NH$_4$)$_2$HPO$_4$ | MnC$_2$O$_4 \cdot$2H$_2$O | coverage |
| Example 1 | 2.746 g | 12.084 g | 9.3375 g | — | — |
| Example 2 | 2.746 g | 6.041 g | 9.3375 g | 6.012 g | — |
| Example 3 | 2.746 g | 6.041 g | 9.3375 g | 6.012 g | — |
| Example 4 | 2.746 g | 12.084 g | 9.3375 g | — | 5 wt % |

In FIG. 5, the solid line represents LiFePO$_4$, the dashed line represents the olivine cathode material according to the present disclosure, and the dot-dashed line represents FePO$_4$. As shown in FIG. 5, the olivine cathode material according to the present disclosure has a high oxidation number, and this is due to the monovalent Li ion replacing a bivalent transition metal site and the same phenomenon appeared even when a transition metal other than iron entered the transition metal site.

Table 3 shows the theoretical lithium ion diffusion activation energies of an olivine cathode material according to the present disclosure and a conventional olivine material.

TABLE 3

| Direction | Activation energy (meV) | |
|---|---|---|
| | LiFePO$_4$ | Li(Li$_{0.05}$Fe$_{0.95}$)PO$_4$ |
| [010] | 444 | 328 |
| [001] | 2187 | 1850 |
| [101] | 2186 | 819 |

As shown in Table 3, the activation energy of the olivine cathode material according to the present disclosure is lower than that of LiFePO$_4$. As in the result of a study using the first calculation principle, it is determined that a cathode material in which excess lithium is present as in the olivine cathode material of the present disclosure can participate in the electrochemical diffusion phenomenon and has a relatively low activation energy.

Figure 6:
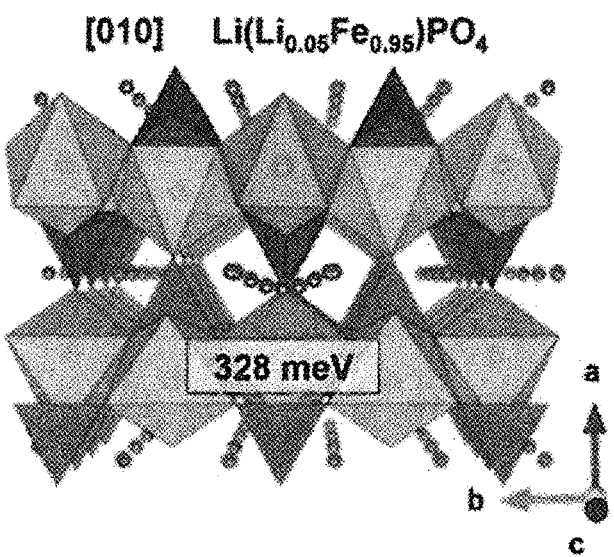
FIG. 6 is a 3-dimensional schematic view of a diffusion of lithium ions in the [010] direction of the olivine cathode material according to the present disclosure.
Figure 7:
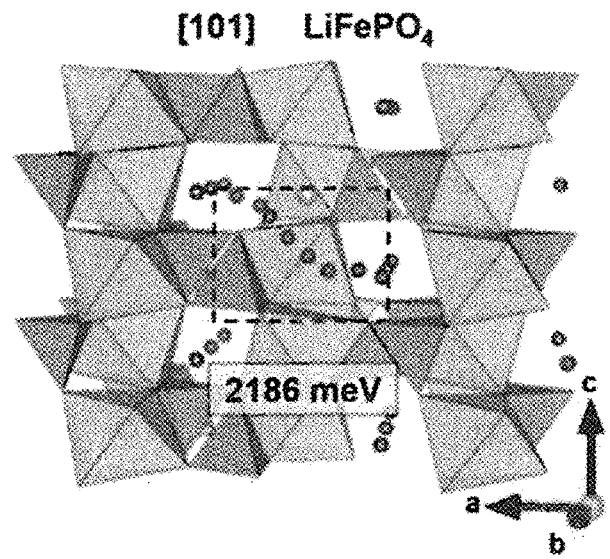
FIG. 7 is a 3-dimensional schematic view of a diffusion of lithium ions in the [101] direction of conventional LiFePO$_4$.
Figure 8:
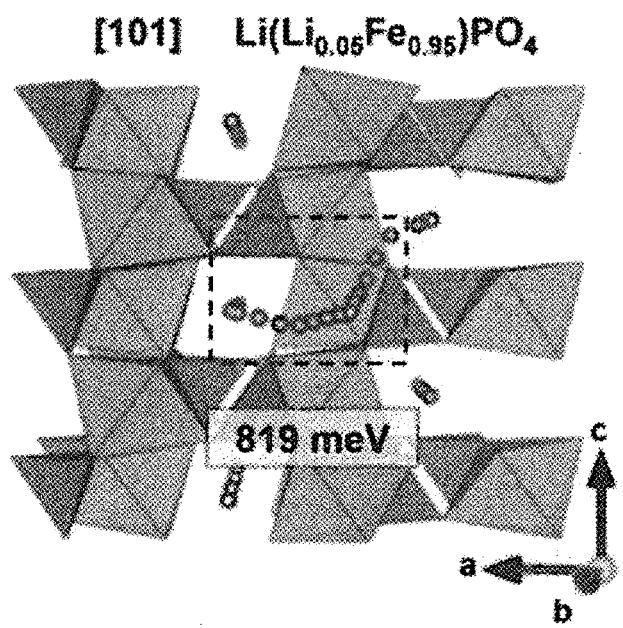
FIG. 8 is a 3-dimensional schematic view of a diffusion of lithium ions in the [101] direction of an olivine cathode material according to the present disclosure.

Further, FIG. 6 is a 3-dimensional schematic view of a diffusion of lithium ions in the [010] direction of the olivine cathode material according to the present disclosure, FIG. 7 is a 3-dimensional schematic view of a diffusion of lithium ions in the [101] direction of conventional LiFePO$_4$, and FIG. 8 is a 3-dimensional schematic view of a diffusion of lithium ions in the [101] direction of an olivine cathode material according to the present disclosure.

As shown in FIGS. 6 to 8, crystallographic diffusion is possible in the [010] and [101] directions and the olivine cathode material according to the present disclosure have lithium in excess to have lower activation energy than LiFePO$_4$. Specifically, diffusion in the [010] direction has an activation energy of 328 meV, and diffusion in the [101] direction has an activation energy of 2186 meV in LiFePO$_4$ whereas the olivine cathode material according to the present disclosure has an activation energy of 819 meV.

Experimental Example 3: Polarization Degree and Charging/Discharging Characteristics of Olivine Cathode Material The degree of polarization and charge and discharge characteristics of an olivine cathode material according to the present disclosure were analyzed, and the results are shown in FIG. 9 and FIG. 10.

Figure 9:
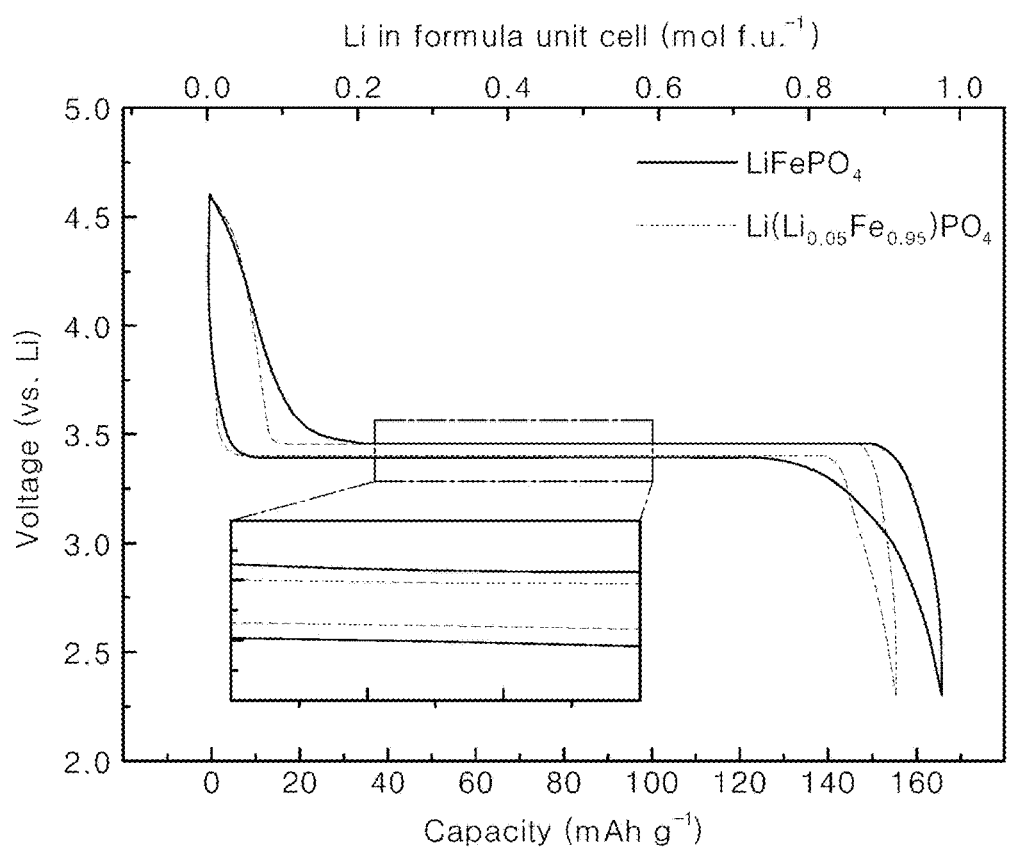
FIG. 9 is a graph showing polarization of an olivine cathode according to the present disclosure.

FIG. 9 is a graph showing polarization of an olivine cathode according to the present disclosure. As shown in FIG. 9, it can be seen that the olivine cathode material according to the present disclosure, which is produced with an excess amount of lithium, has a relatively low polarization.

Figure 10:
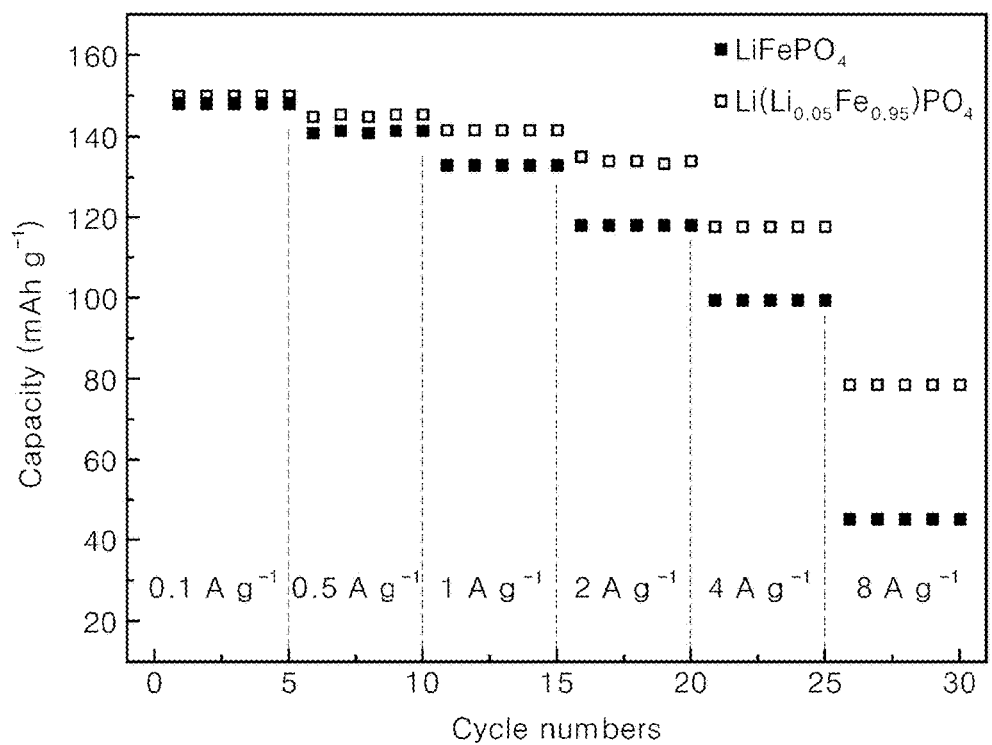
FIG. 10 is a graph showing charge/discharge capacity and charge/discharge efficiency of an olivine cathode material according to the present disclosure.

Further, FIG. 10 is a graph showing charge/discharge capacity and charge/discharge efficiency of an olivine cathode material according to the present disclosure. As shown in FIG. 10, it can be seen that the olivine cathode material according to the present disclosure has a higher charging/discharging capacity than LiFePO$_4$, shows an increased fast charging and discharging effects, and has a high charging/discharging efficiency.

Although exemplary embodiments related to the olivine cathode material capable of 3-dimensional lithium diffusion according to the present disclosure and a method for preparing the olivine cathode material have been described above, it is apparent that various modifications can be made without departing from the scope of the present disclosure.

Therefore, the scope of the present invention should not be limited to the embodiments described, but should be determined by the equivalents of the claims, as well as the following claims.

It is to be understood that the above-mentioned embodiments are illustrative and not restrictive in all respects and that the scope of the present invention is indicated by the appended claims rather than the above-mentioned description, and all changes or modifications derived from the equivalents thereof should be construed as being included within the scope of the present invention.

What is claimed is:

1. A method of preparing an olivine cathode capable of 3-dimensional lithium diffusion comprising,
   preparing a mixed powder by mixing a lithium precursor, an iron precursor, and an ammonium compound;
   compressing after performing primary heat treatment on the mixed powder; and
   performing secondary heat treatment on the compressed mixed powder, wherein the lithium precursor, the iron precursor and the ammonium compound are mixed to have a molar ratio of lithium (Li): transition metal (TM): phosphorus (P) configured to remove cation exchange defects, the molar ratio being 1+x (1.01 to 1.05):1−x (0.95 to 0.99):1, where x is 0.01 to 0.05, the olivine cathode has crystal structure of Pnma or Pnmb,
   wherein the transition metal (TM) is derived from the iron precursor, and the phosphorus (P) is derived from the ammonium compound,
   wherein the primary heat treatment is performed in an inert atmosphere of argon or nitrogen at 300° C. to 500° C. for 4 to 10 hours, and
   wherein the secondary heat treatment temperature is performed in an inert atmosphere at 550° C. to 650° C. for 4 to 10 hours.

2. The method of claim 1, wherein the lithium precursor is one selected from a group consisting of lithium carbonate (Li$_2$CO$_3$), lithium phosphate (Li$_3$PO$_4$), lithium oxalate (Li$_2$C$_2$O$_4$), and lithium hydroxide (LiOH).

3. The method of claim 1, wherein the iron precursor is one selected from a group consisting of iron oxalate dehydrate (FeC$_2$O$_4$.2H$_2$O), ferrous sulfate heptahydrate (FeSO$_4$.H$_2$O), ferric citrate hydrate (FeC$_6$H$_5$O$_7$.nH$_2$O), ferric phosphate dihydrate (FePO$_4$.H$_2$O), and ferric hydroxide (FeO(OH)).

4. The method of claim 1, wherein the ammonium compound is diammonium phosphate [(NH$_4$)$_2$HPO$_4$].

5. The method of claim 1, wherein a manganese precursor is further comprised when preparing the mixed powder.

6. The method of claim 5, wherein the manganese precursor is MnC$_2$O$_4$.2H$_2$O.

* * * * *